United States Patent
Karam

(10) Patent No.: US 8,768,296 B2
(45) Date of Patent: *Jul. 1, 2014

(54) METHOD AND APPARATUS FOR RANDOM ACCESS OF VOICE MAIL MESSAGES

(75) Inventor: Gerald Karam, Morristown, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 30 days.

This patent is subject to a terminal disclaimer.

(21) Appl. No.: 13/550,472

(22) Filed: Jul. 16, 2012

(65) Prior Publication Data

US 2012/0282902 A1    Nov. 8, 2012

Related U.S. Application Data

(63) Continuation of application No. 11/312,204, filed on Dec. 20, 2005, now Pat. No. 8,224,288.

(51) Int. Cl.
*H04M 11/00* (2006.01)
*H04L 12/58* (2006.01)
*H04M 1/663* (2006.01)

(52) U.S. Cl.
USPC ............ 455/405; 455/412.2; 379/88.01; 379/93.24

(58) Field of Classification Search
CPC .... H04M 2215/32; H04M 15/00; H04W 4/24
USPC ............... 455/405, 412.5; 379/88.01, 93.24, 379/202.1
See application file for complete search history.

(56) References Cited

U.S. PATENT DOCUMENTS

| | | |
|---|---|---|
| 5,818,915 A | 10/1998 | Hayes et al. |
| 6,339,591 B1 | 1/2002 | Migimatsu |
| 7,251,314 B2 | 7/2007 | Huang |
| 7,251,480 B1 | 7/2007 | Oh et al. |
| 8,224,288 B1 * | 7/2012 | Karam ........................ 455/405 |
| 8,571,193 B2 * | 10/2013 | Oliver et al. ............ 379/202.01 |
| 8,594,634 B2 * | 11/2013 | Aberethy et al. ......... 455/412.1 |
| 8,605,718 B2 * | 12/2013 | Hemar et al. ................ 370/386 |
| 8,611,512 B2 * | 12/2013 | Owens et al. ............. 379/93.24 |
| 8,639,235 B2 * | 1/2014 | Zellner ........................ 455/419 |
| 2012/0282902 A1 * | 11/2012 | Karam ...................... 455/412.2 |
| 2013/0286900 A1 * | 10/2013 | Castell et al. ................ 370/260 |
| 2013/0294590 A1 * | 11/2013 | McAllister ................ 379/88.04 |
| 2013/0304477 A1 * | 11/2013 | Kurganov .................. 704/270.1 |
| 2014/0016760 A1 * | 1/2014 | Chaudhuri et al. ........ 379/88.01 |
| 2014/0018043 A1 * | 1/2014 | Oliver et al. ................. 455/411 |

* cited by examiner

Primary Examiner — William D Cumming

(57) ABSTRACT

A method and apparatus for allowing a telephone service subscriber to receive an email notification, e.g., a SMS notification, at an endpoint device that a new voice mail message has been received. The SMS notification comprises a voice mailbox access phone number, selected from a pool of unassigned access phone numbers, which can be used to provide direct access to the new voice mail message in the telephone service subscriber's voice mailbox. Thus, a different voice mailbox access phone number is sent in each SMS notification to the telephone service subscriber for each new voice mail message, thereby providing direct access to specific voice mail messages via different voice mailbox access phone numbers.

20 Claims, 5 Drawing Sheets

METHOD AND APPARATUS FOR RANDOM ACCESS OF VOICE MAIL MESSAGES

This application is a continuation of U.S. patent application Ser. No. 11/312,204, filed Dec. 20, 2005, currently allowed, which is herein incorporated by reference in its entirety.

The present invention relates generally to communication networks and, more particularly, to a method and apparatus for random access of voice mail messages through email notifications, e.g., cellular Short Message Service (SMS) notifications, in communication networks, e.g., telephony networks such as Public Switched Telephone Network (PSTN) voice, Voice over Internet Protocol (VoIP) packet voice, and cellular voice networks.

BACKGROUND OF THE INVENTION

When a telephone service subscriber receives a notification of a voice mail message via a Short Message Service (SMS) notification, the subscriber must call a voice mailbox access number and then sift through other unheard voice messages to access a particular voice message of interest. Thus, while the notification is convenient as is commonly done today, the access problem to access directly and listen to a particular voice mail message of interest still remains.

Therefore, a need exists for a method and apparatus for random access of voice mail messages through cellular Short Message Service (SMS) notifications in telephony networks such as Public Switched Telephone Network (PSTN) voice, Voice over Internet Protocol (VoIP) packet voice, and cellular voice networks.

SUMMARY OF THE INVENTION

In one embodiment, the present invention enables a telephone service subscriber to receive an email notification, e.g., a SMS notification, at an endpoint device, such as a cellular phone, when a new voice mail message is received. For example, the SMS notification comprises a voice mailbox access phone number, e.g., selected from a large pool of such access phone numbers, which can be used to provide direct access to the new voice mail message in the telephone service subscriber's voice mailbox. Thus, a different voice mailbox access phone number is sent in each SMS notification to the telephone service subscriber for each new voice mail message and thus provides a means to provide random direct access to specific voice mail messages via different voice mailbox access phone numbers.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

When a telephone service subscriber receives a notification of a voice mail message via an email notification, e.g., a Short Message Service (SMS) notification, the subscriber must call a voice mailbox access number and then sift through other unheard voice messages to access a particular voice message of interest. Thus, while the notification is convenient as is commonly done today, the access problem to access directly and listen to a particular voice mail message of interest still remains.

To address this criticality, the present invention enables a telephone service subscriber to receive an email notification, e.g., a SMS notification, at a cellular endpoint device, such as a cellular phone, when a new voice mail message is received. The SMS notification comprises a voice mailbox access phone number, e.g., selected from a large pool of such access phone numbers, which can be used to provide direct access to the new voice mail message in the telephone service subscriber's voice mailbox. Thus, a different voice mailbox access phone number is sent in each SMS notification to the telephone service subscriber for each new voice mail message and thus provides a means to provide random direct access to specific voice mail messages via different voice mailbox access phone numbers.

Figure 1:
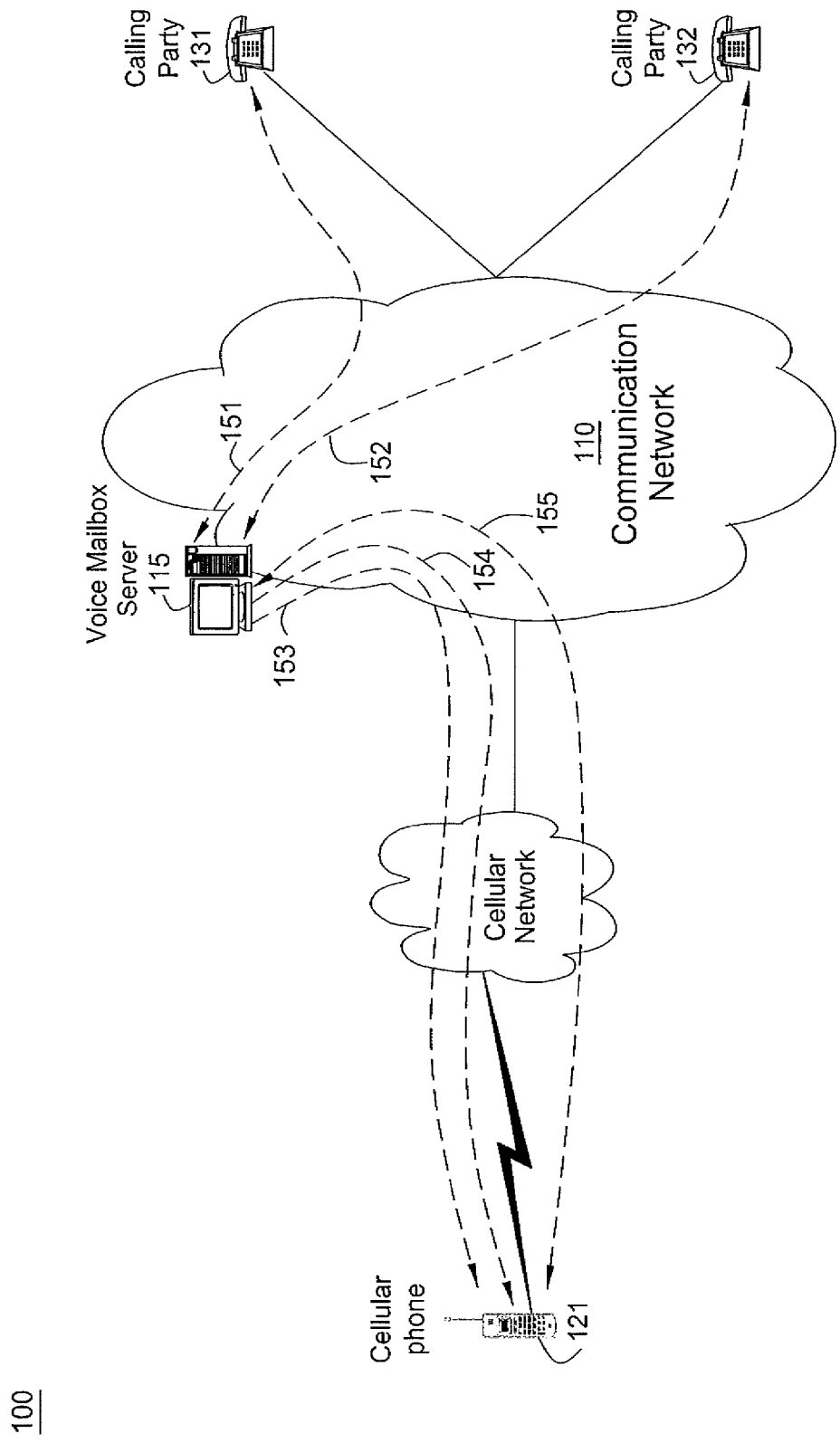
FIG. 1 illustrates an example of random access of voice mail messages through cellular SMS notifications in a communication network of the present invention.

FIG. 1 illustrates an example of random access of voice mail messages through email notifications, e.g., cellular SMS notifications, in a communication network 100 of the present invention. A communication network includes, but is not limited to, telephony networks such as Public Switched Telephone Network (PSTN), an IP network, e.g., a Voice over Internet Protocol (VoIP) network, and a cellular voice network. In FIG. 1, calling party 131 makes a call to a called party who is a subscriber of telephony services of voice network 110. Calling party 131 cannot reach the called party and leaves a voice mail message in the voice mailbox of the called party using flow 151. The voice mail message is recorded and stored by voice mailbox server 115 residing in communication network 110. In addition, the called party subscriber of communication network 110 has registered with communication network 110 that whenever a new voice mail message is received, the network will send a SMS notification to a registered cellular phone, e.g., cellular phone 121 in this instance, to inform the called party of the receipt of the new voice mail message.

Voice mailbox server 115, upon receiving the new voice mail message from calling party 131, sends a SMS notification to cellular phone 121 using flow 153. The SMS notification may include the caller identification (ID) information of calling party 131 and a voice mailbox access phone number, e.g. access phone number A, which is not currently assigned and associated with any previous voice mail messages for the called party subscriber. At this point, voice mailbox server 115 associates the voice mail message left by calling party 131 with access phone number A and the called party subscriber. The caller ID information includes, but is not limited to, the name and the phone number of calling party 131.

Access phone number A is a voice mailbox access phone number which is not currently assigned and associated with any previous voice mail messages for the called party subscriber and can be used to directly access voice mail message left by calling party 131 by bypassing all other voice mail messages stored in the voice mailbox.

In one embodiment, the called party using cellular phone 121 can first read the received SMS notification and then use the send or call button on the cellular phone to access the voice mail message left by calling party 131. In particular, the cellular phone extracts the voice mailbox access phone number, e.g., access phone number A in this case, and dials access phone number A to access voice mailbox server 115 using flow 155. Upon receiving a call from cellular phone 121 through access phone number A, voice mailbox server 115 uses the incoming phone number of cellular phone 121 and the voice mailbox access phone number A through which the call is received to determine that the caller is calling to access the voice mail message left by calling party 131. In one embodiment, voice mailbox server 115 prompts the caller for a Personal Identification Number (PIN) if required to authenticate direct access to the voice mail message left by calling party 131. Once the direct access is authenticated, voice mailbox server plays the stored voice mail message left by calling party 131 to the called party subscriber.

Subsequently, calling party 132 makes a call to the same called party who is a subscriber of telephony services of communication network 110. Calling party 132 cannot reach the called party and leaves a voice mail message in the voice mailbox of the called party using flow 152. The voice mail message is recorded and stored by voice mailbox server 115 residing in communication network 110. Since the called party subscriber of communication network 110 has registered with communication network 110 that whenever a new voice mail message is received, the network will send a SMS notification to a registered cellular phone, e.g., a cellular phone 121 in this instance, to inform the called party of the receipt of the new voice mail message. It should be noted that although endpoint 121 is illustrated as a mobile endpoint device, e.g., a cellular phone, it can also be a wired endpoint device, e.g., an IP phone and the like.

Voice mailbox server 115, upon receiving the new voice mail message, sends a SMS notification to cellular phone 121 using flow 154. The SMS notification includes the caller identification (ID) information of calling party 132 and a voice mailbox access phone number, e.g. access phone number B, which is not currently assigned and associated with any previous voice mail messages for the called party subscriber. At this point, voice mailbox server 115 associates the voice mail message left by calling party 132 with access phone number B and the called party subscriber. The caller ID information includes, but is not limited to, the name and the phone number of calling party 132. Access phone number B is a voice mailbox access phone number, different from access phone number A, which is not currently assigned and associated with any previous voice mail messages for the called party subscriber and can be used to directly access voice mail message left by calling party 132 by bypassing all other voice mail messages stored in the voice mailbox. Voice mailbox server 115 has access to a large pool of such unassigned access phone numbers, e.g., listed in a database stored within the voice mailbox server.

In one embodiment, the called party using cellular phone 121 can first read the received SMS notification and then use the send or call button on the cellular phone to access the voice mail message left by calling party 132. In particular, the cellular phone extracts the voice mailbox access phone number, access phone number B in this case, and dials access phone number B to access voice mailbox server 115 using flow 155. Upon receiving a call from cellular phone 121 through access phone number B, voice mailbox server 115 uses the incoming phone number of cellular phone 121 and the voice mailbox access phone number B through which the call is received to determine that the caller is calling to access the voice mail message left by calling party 132. In one embodiment, voice mailbox server 115 prompts the caller for a Personal Identification Number (PIN), if required, to authenticate direct access to the voice mail message left by calling party 132. Once the direct access is authenticated, voice mailbox server plays the stored voice mail message left by calling party 132 to the called party subscriber.

The association of voice mail messages and voice mailbox access phone number remains until a voice mail message is deleted from the voice mailbox. When a voice mail message is deleted, the voice mailbox access phone number associated with the deleted voice mail message will be returned to the pool of unassigned voice mailbox access phone numbers that can be associated with subsequent new incoming voice mail messages. The number of voice mailbox access phone number is a configurable parameter set by the network provider. In one embodiment, the number of voice mailbox access phone number is engineered to be equal to the maximum number of voice mail messages that can be stored in the voice mailbox of a subscriber. The maximum number of voice mail messages that can be stored in the voice mailbox of a subscriber is also a configurable parameter set by the network provider.

Figure 2:
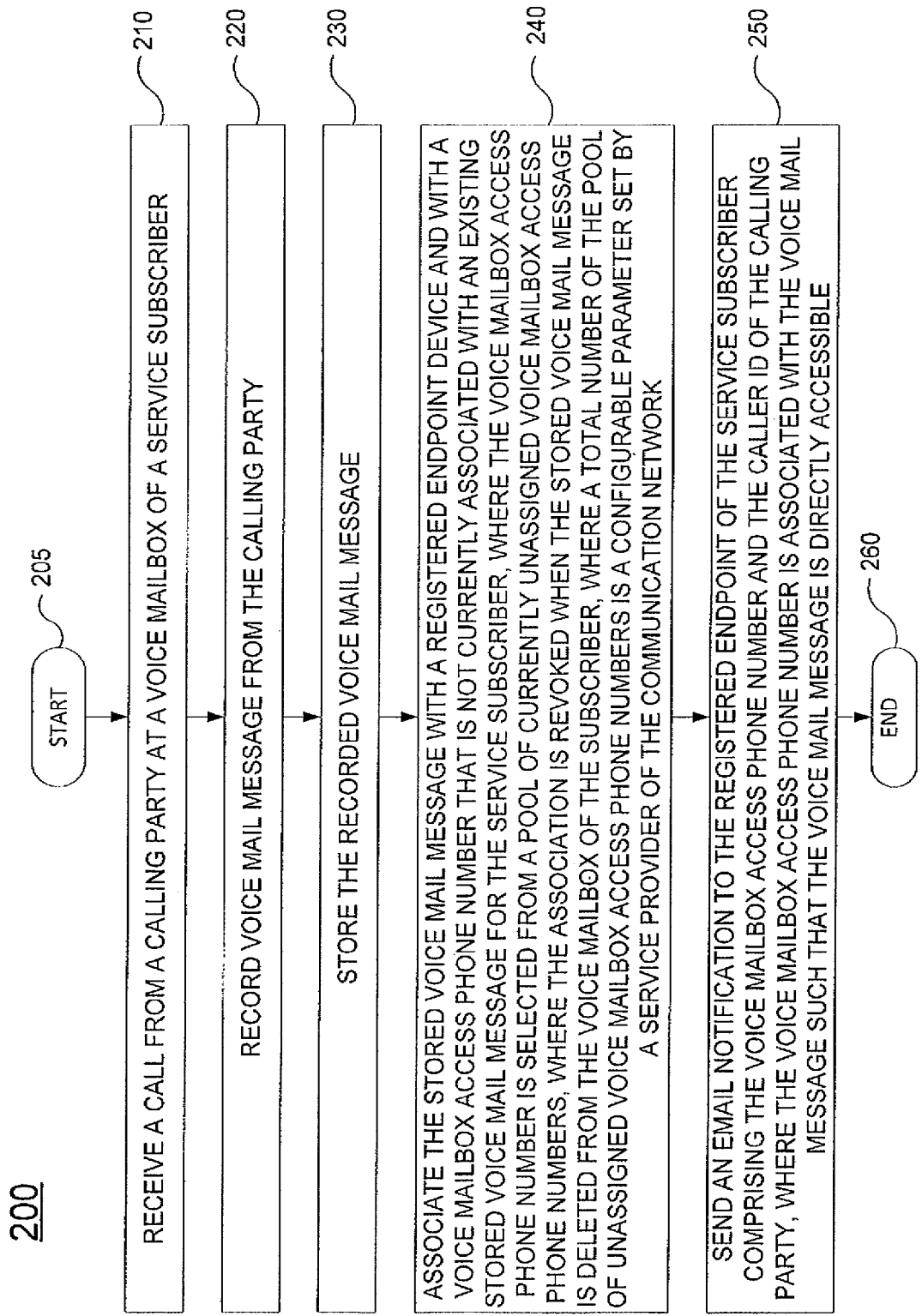
FIG. 2 illustrates a flowchart of a method for sending a SMS notification to a cellular endpoint device of the present invention.

FIG. 2 illustrates a flowchart of a method 200 for sending an email notification, e.g., a SMS notification, to a cellular endpoint device of the present invention. The method is executed by a voice mailbox server. Method 200 starts in step 205 and proceeds to step 210.

In step 210, the method receives a call at a voice mailbox of a service subscriber from a calling party. For example, the called party is not available or is unreachable.

In step 220, the method records a voice mail message from the calling party.

In step 230, the method stores the recorded voice mail message in the network. For example, the voice mail message is stored by a voice mailbox server.

In step 240, the method associates the stored voice mail message with a voice mailbox access phone number that is not currently associated with any existing stored voice mail messages for the service subscriber. Namely, a large pool of unassigned access phone numbers is made available to the voice mailbox server.

In step 250, the method sends a SMS notification to a registered cellular endpoint device of the service subscriber. In one embodiment, the SMS notification includes the caller ID information, such as the caller's name and phone number, and a voice mailbox access phone number that is not currently associated with any existing stored voice mail messages for the service subscriber. The method ends in step 260.

Figure 3:
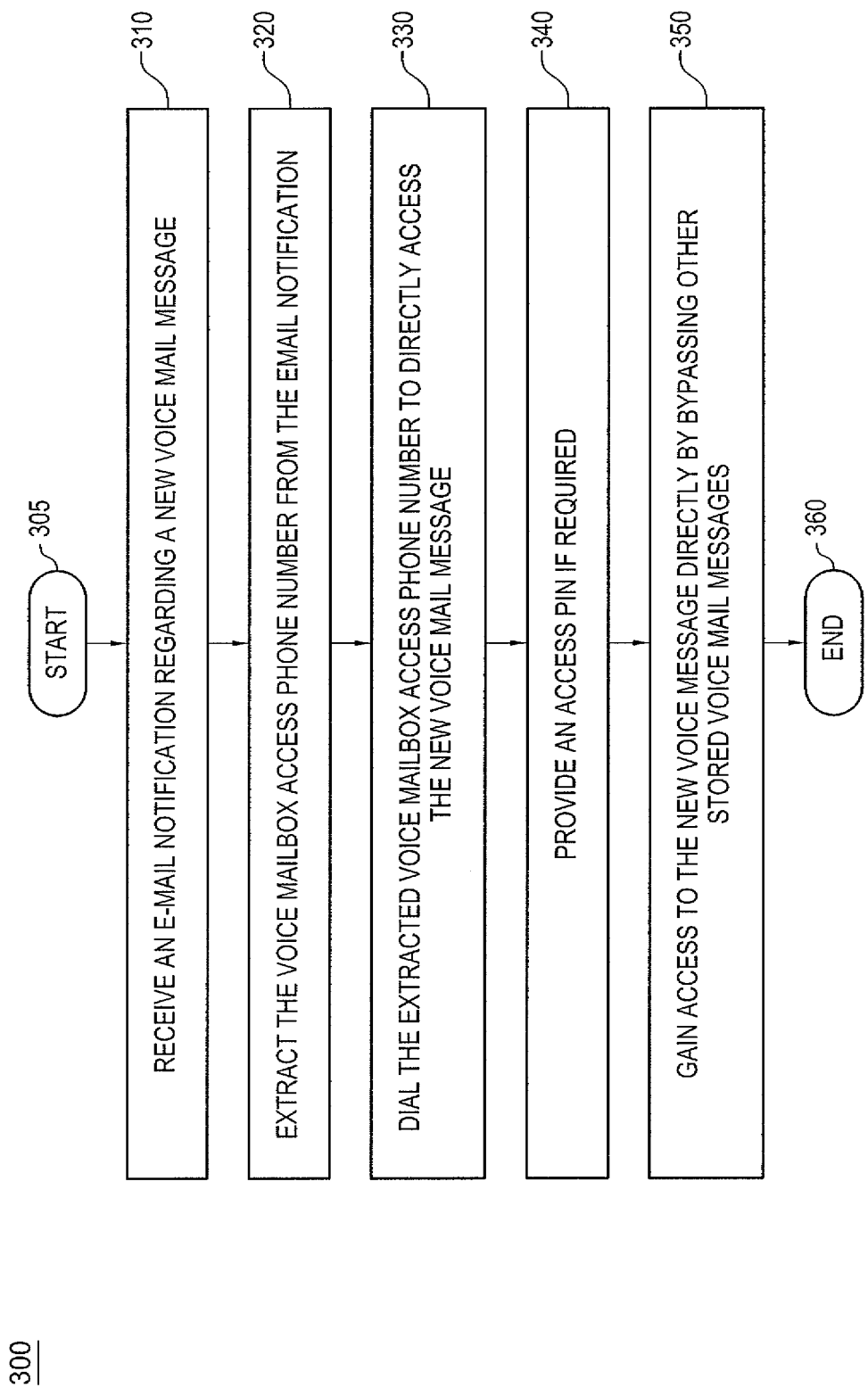
FIG. 3 illustrates a flowchart of a method for accessing voice mail messages from a cellular endpoint device using specific voice mailbox access phone numbers provided in a SMS notification of the present invention.

FIG. 3 illustrates a flowchart of a method 300 for accessing voice mail messages from a cellular endpoint device using specific voice mailbox access phone numbers provided in an email notification, e.g., a SMS notification, of the present invention. For example, the method is executed by a cellular endpoint device that is registered with the communication network for providing voice mail services to a subscriber. Method 300 starts in step 305 and proceeds to step 310.

In step 310, the method receives a SMS notification regarding the arrival of a new voice mail message in the voice mailbox of the service subscriber. In one embodiment, the SMS notification includes the caller ID information, such as the caller's name and phone number, and a voice mailbox access phone number that is not currently associated with any existing stored voice mail messages for the service subscriber.

In step 320, the method extracts the voice mailbox access phone number embedded in the SMS notification.

In step 330, the method, upon receiving an instruction from the service subscriber such as by pressing the send or call button on the cellular phone, dials the extracted voice mailbox access phone number to directly access the new voice mail message indicated by the SMS notification.

In step 340, the method provides a PIN to authenticate access to the voice mailbox of the service subscriber. For example, the PIN is entered by the service subscriber when prompted.

In step 350, the method gains direct access to the voice mail message associated with the extracted voice mailbox access phone number by bypassing other stored voice mail messages stored in the voice mailbox. The method ends in step 360.

Figure 4:
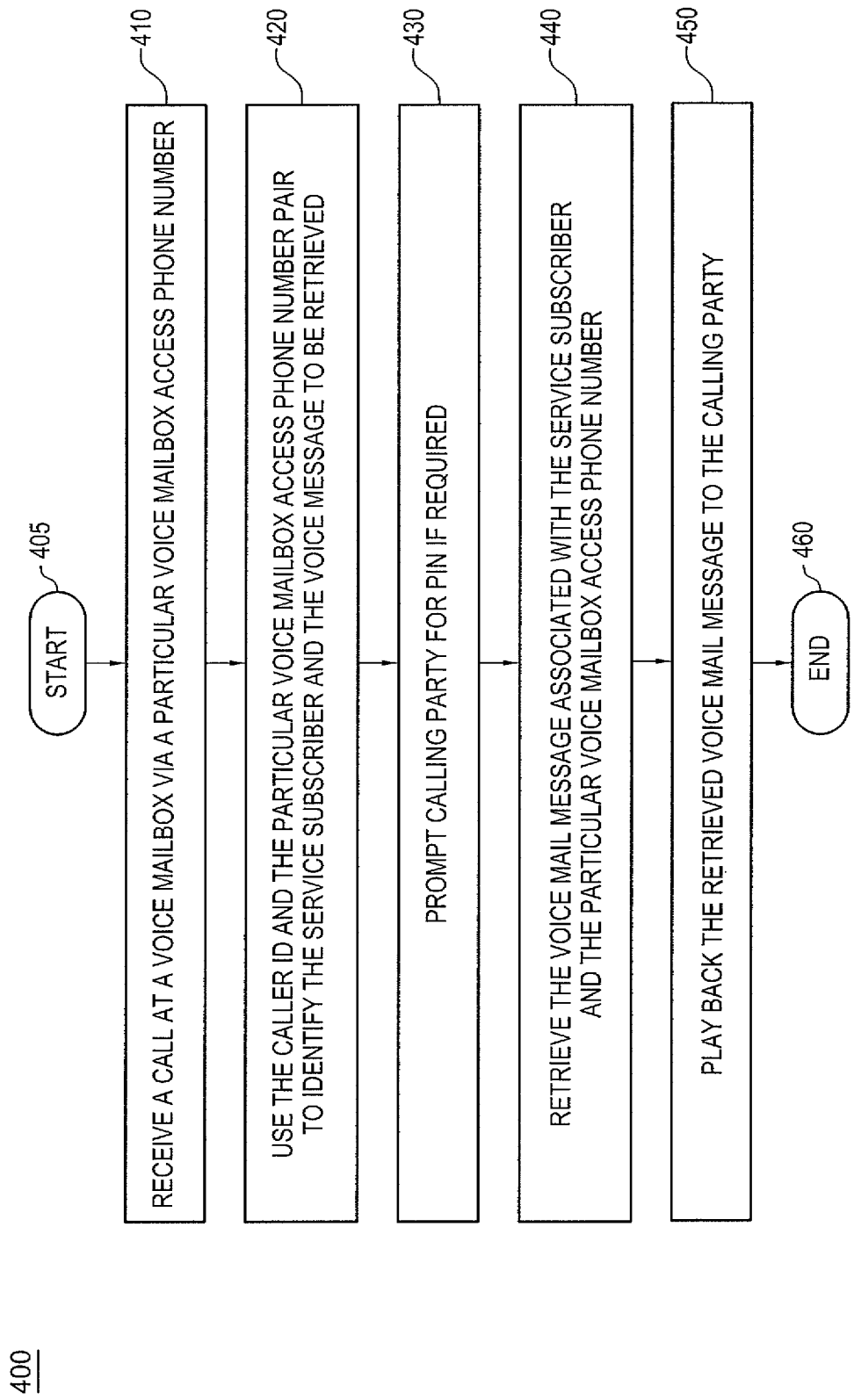
FIG. 4 illustrates a flowchart of a method for directly retrieving a specific voice mail message stored in a voice mailbox of the present invention.

FIG. 4 illustrates a flowchart of a method 400 for directly retrieving a specific voice mail message stored in a voice mailbox of the present invention. For example, the method is executed by a voice mailbox server. Method 400 starts in step 405 and proceeds to step 410.

In step 410, the method receives a call at a voice mailbox via a particular voice mailbox access phone number.

In step 420, the method uses the caller ID of the calling cellular endpoint device and the particular voice mailbox access phone number through which the call is received to identify the service subscriber mailbox and the particular voice mail message to be retrieved.

In step 430, the method prompts the calling party for a PIN to authenticate access to the service subscriber's voice mailbox, if required.

In step 440, the method, after proper authentication if required, retrieves the particular voice mail message associated with the service subscriber and the particular voice mailbox access phone number.

In step 450, the method retrieves the voice mail message associated with the calling cellular endpoint device and the particular voice mailbox access phone number and plays it through the calling cellular endpoint device to the calling party. The method ends in step 460.

Figure 5:
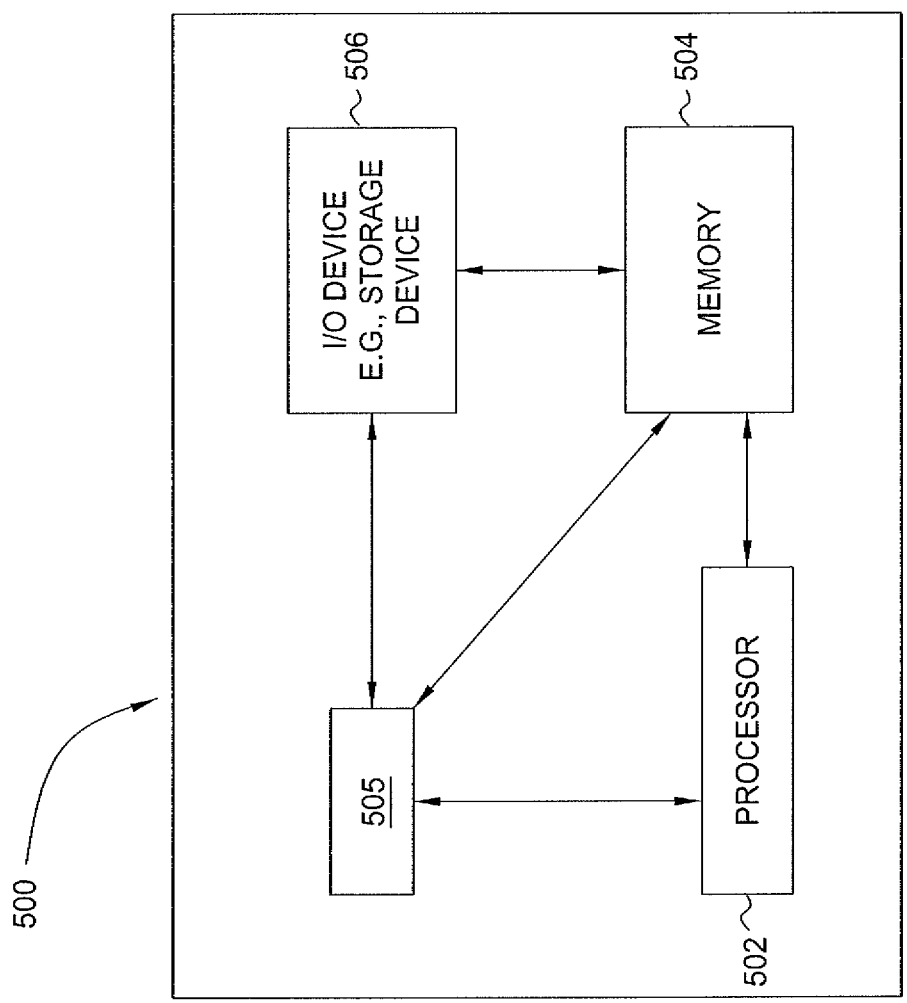
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing random access of voice mail messages through email notifications, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing random access of voice mail messages through email notifications can be loaded into memory 504 and executed by processor 502 to implement the functions as discussed above. As such, the present process 505 for providing random access of voice mail messages through email notifications (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing an access of a voice mail message in a communication network, comprising:
   receiving, by a computer comprising a processor, the voice mail message at a voice mailbox for a subscriber from a calling party;
   recording, by the computer, the voice mail message from the calling party into the voice mailbox of the subscriber;
   associating, by the computer, the voice mail message with a voice mailbox access phone number, where the voice mailbox access phone number is selected from a pool of unassigned voice mailbox access phone numbers; and
   sending, by the computer, a message notification to an endpoint device of the subscriber, the message notification containing the voice mailbox access phone number, where the voice mailbox access phone number is for accessing the voice mail message such that the voice mail message is directly accessible when the voice mail box access phone number is dialed.

2. The method of claim 1, wherein the communication network comprises a cellular voice network.

3. The method of claim 1, wherein an association resulting from the associating is revoked when the voice mail message is deleted from the voice mailbox of the subscriber.

4. The method of claim 1, wherein a total number of the pool of unassigned voice mailbox access phone numbers is a configurable parameter set by a service provider of the communication network.

5. The method of claim 1, wherein the endpoint is a mobile endpoint device.

6. The method of claim 1, wherein the sending comprises:
   embedding the voice mailbox access phone number and a calling party caller identification information in the message notification.

7. The method of claim 6, wherein the caller identification information comprises a phone number of the calling party.

8. The method of claim 1, further comprising:
   receiving a call from the endpoint device via the voice mailbox access phone number to access the voice mail message;
   using a caller identification of the endpoint device and the voice mailbox access phone number to identify the voice mail message; and
   retrieving directly the voice mail message by bypassing any other voice mail messages stored in the voice mailbox.

9. The method of claim 8, wherein the voice mail message is provided to the endpoint device after a personal identification number is received and authenticated.

10. The method of claim 1, wherein the message notification is sent by the processor of a voice mailbox server deployed in the communication network.

11. The method of claim 1, wherein the message notification is a short message service notification.

12. A tangible computer-readable medium storing instructions which, when executed by a processor of a computer, cause the computer to perform operations for providing a random access of a voice mail message in a communication network, the operations comprising:

receiving the voice mail message at a voice mailbox for a subscriber from a calling party;

recording the voice mail message from the calling party into the voice mailbox of the subscriber;

associating the voice mail message with a voice mailbox access phone number, where the voice mailbox access phone number is selected from a pool of unassigned voice mailbox access phone numbers; and sending a message notification to an endpoint device of the subscriber, the message notification containing the voice mailbox access phone number, where the voice mailbox access phone number is for accessing the voice mail message such that the voice mail message is directly accessible when the voice mail box access phone number is dialed.

13. The tangible computer-readable medium of claim 12, wherein the communication network comprises a cellular voice network.

14. The tangible computer-readable medium of claim 12, wherein the association is revoked when the stored voice mail message is deleted from the voice mailbox of the subscriber.

15. The tangible computer-readable medium of claim 12, wherein the sending comprises:

embedding the voice mailbox access phone number and a calling party caller identification information in the message notification.

16. The tangible computer-readable medium of claim 15, wherein the caller identification information comprises a phone number of the calling party.

17. The tangible computer-readable medium of claim 12, further comprising:

receiving a call from the endpoint device via the voice mailbox access phone number to access the voice mail message;

using a caller identification of the endpoint device and the voice mailbox access phone number to identify the voice mail message; and retrieving directly the voice mail message by bypassing any other voice mail messages stored in the voice mailbox.

18. An apparatus for providing a random access of a voice mail message in a communication network, comprising:

a server comprising a processor and a computer-readable medium, the computer-readable medium storing instructions which, when executed by the processor, cause the server to perform operations, the operations comprising:

receiving the voice mail message at a voice mailbox for a subscriber from a calling party;

recording the voice mail message from the calling party into the voice mailbox of the subscriber;

associating the voice mail message with a voice mailbox access phone number, where the voice mailbox access phone number is selected from a pool of unassigned voice mailbox access phone numbers; and sending a message notification to an endpoint device of the subscriber, the message notification containing the voice mailbox access phone number, where the voice mailbox access phone number is for accessing the voice mail message such that the voice mail message is directly accessible when the voice mail box access phone number is dialed.

19. The apparatus of claim 18, wherein an association resulting from the associating is revoked when the voice mail message is deleted from the voice mailbox of the subscriber.

20. The apparatus of claim 18, wherein a total number of the pool of unassigned voice mailbox access phone numbers is a configurable parameter set by a service provider of the communication network.

* * * * *